United States Patent [19]

Daberkoe

[11] Patent Number: 4,699,431
[45] Date of Patent: Oct. 13, 1987

[54] PILOTED WHEEL ASSEMBLY
[75] Inventor: Charles W. Daberkoe, Highland, Mich.
[73] Assignee: General Motors Corporation, Detroit, Mich.
[21] Appl. No.: 879,034
[22] Filed: Jun. 26, 1986
[51] Int. Cl.⁴ ............................................. B60B 37/00
[52] U.S. Cl. ..................................... 301/1; 301/9 DN; 301/5 R; 301/63 R; 301/105 R; 301/111; 29/464; 403/13; 267/160; 267/292
[58] Field of Search ................. 301/6 R, 9 DN, 63 R, 301/105 R, 1, 5 R, 111; 29/464; 267/152, 153, 158, 160, 63 R; 403/13; 384/492, 535, 536

[56] References Cited
U.S. PATENT DOCUMENTS 2,812,216 11/1957 Hykes et al. .................... 301/6 R X
3,138,407 6/1964 Duggan .............................. 301/9 R
3,154,348 10/1964 Hibbard ............................. 301/6 R
3,366,421 1/1968 Bradley ............................. 301/9 R
3,467,451 9/1969 Marley ........................... 384/535 X
4,142,618 3/1979 Fontaine et al. .................. 384/535
4,437,782 3/1984 Geisthoff ............................ 403/13

Primary Examiner—David A. Scherbel
Assistant Examiner—Russell D. Stormer
Attorney, Agent, or Firm—Dean L. Ellis

[57] ABSTRACT

A vehicle wheel assembly includes a wheel having a central pilot flange sized loosely with respect to a pilot boss on the wheel-carrying hub member but interferingly engageable with circumferentially spaced resiliently deflectable elements projecting from the boss outer surface and operative to substantially center the wheel on the hub.

5 Claims, 4 Drawing Figures

PILOTED WHEEL ASSEMBLY

This invention relates to wheel assemblies and more particularly to such assemblies including a detachable wheel mounted on a wheel-carrying hub having means for substantially centering the wheel thereon.

Most particularly, the invention relates to automotive and like vehicle wheel assemblies wherein it is important to achieve accurate centering of a detachable wheel and tire mass on the mass of a rotatable wheel-carrying hub so as to avoid troublesome unbalance of the joined assembly as during high speed road travel. Prior practice has been typically the accurate location of wheel-attaching threaded studs on an imaginary stud circle centered on the axis of the wheel-carrying hub mass, with tapered seat lug nuts engageable in accurately located complementary apertures arranged about the wheel mass axis.

Alternatively, it has been known to construct piloting boss and pilot flange means on the hub and at a center hole of the wheel respectively, sized relative one another to engage upon mounting of the wheel on the hub and establish centering therebetween. U.S. Pat. Nos. 3,138,407 and Bradley 3,366,421 are illustrative thereof and each feature a series of pilot flange portions spaced about the wheel center hole to locally engage the cylindrical surface of the pilot boss of the wheel-carrying hub. It is also known, as in Hibbard 3,154,348, to employ a threaded center boss on the hub for receiving a securing spinner nut provided with a tapered pilot portion engaged with a central flange of the wheel to achieve such centering. Spinner nut assemblies, however, offer only limited use in automobiles when considering wheel attachment security and the latitude desired in the styling of automotive wheels.

As to the typical use of angularly spaced holes and securing studs on the wheel and hub, I believe that undue manufacturing difficulties and costs arise in the circumstances of mass manufacture when attempting to achieve accuracy of the stud and aperture circles on the hub mass and wheel mass. The pilot boss expedients of Duggan and Bradley, among other drawbacks relating to steel pressing or finishing restrictions, do not due to their reliance on engaging fit without clearance of their rigid shaped pilot flange portions directly on the hub boss, accommodate difficulties which can arise in use of such wheels such as deterioration of the engaging surfaces through corrosion or the build-up of road deposits.

By the present invention, I provide pilot centering means for such wheel assemblies wherein the wheel includes a pilot flange at its center hole accurately located in the wheel mass but sized to be loosely received over the outer surface of the accurately shaped pilot boss of the wheel hub without direct engagement therewith. The stud apertures on the wheel are likewise overlarge for looseness relative the hub studs. For precise centering, I provide a series of radially inwardly deflectable elements which project at spaced locations around the pilot boss surface therefrom for interfering engagement with such flange. These elements are radially inwardly deflectable, as the wheel is installed, against the resistance of resilient means operative to permit with relative ease the placement of the flange interferingly over the pilot boss, yet also operative to sustain the weight of the wheel and tire assembly and substantially center the same on the wheel hub axis when it is normal vertical orientation. The wheel is then simply secured on the hub by use of flat seat lug nuts.

In a preferred embodiment, the deflectable elements take the form of a series of balls each located in one of a series of apertures in the outer surface of the wheel hub pilot boss, projecting therefrom for interfering engagement with a central wheel pilot flange and readily cammable inwardly upon the installation of the wheel mass. A variety of resilient means may be employed to press the balls outwardly with the force level hereinabove noted.

These and other features and advantages of the invention will be readily apparent from the following specification and from the drawings, wherein.

Figure 1:
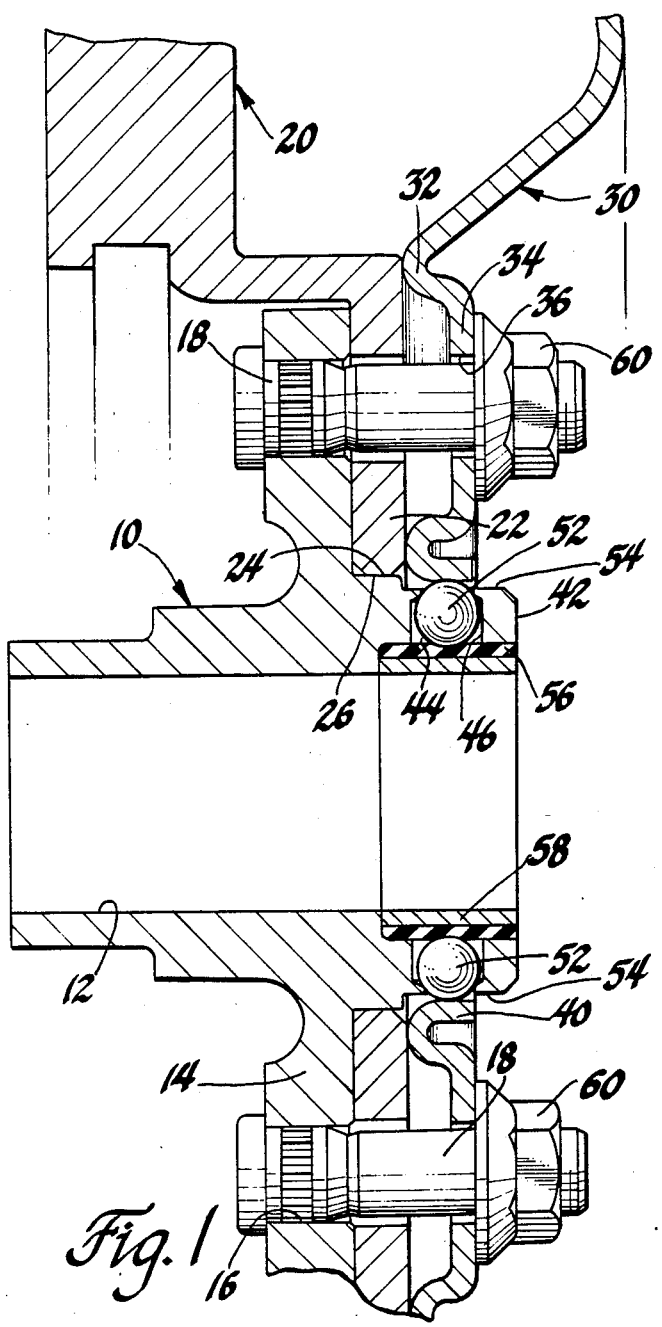
FIG. 1 is a fragmentary sectional view of a piloted wheel assembly according to this invention.

Referring now to FIG. 1 of the drawings, the same illustrates a preferred embodiment of a piloted wheel assembly of the invention intended for use in automotive vehicles, the illustrated structure particularly showing a detachable unit of the type as would be associated with, for example, the spindle of a front wheel forged or similarly formed suspension knuckle member which carries the usual brake caliper assembly, etc. Such spindle, which is very well known and therefore not shown, may be plain surfaced or carry torque transmitting splines as in front-wheel drive application, the end of the spindle being suitably threaded to receive a nut thereover for securement of the hub member of the wheel assembly on the vehicle. It will be appreciated as the description proceeds that the principles of the invention are readily applicable to other forms of wheel carrying hub construction, including those integral with driving axle shafts, etc.

In this embodiment the assembly includes a wheel carrying hub 10 of cast or forged construction with a central bore 12 receiving the knuckle spindle with appropriate anti-friction bearing relationship therewith, the details of which are not peculiarly related with the invention. An attaching flange 14 projects from the main body of the hub 10 and has a number of apertures as at 16 so as to have securely force-fitted therein a complementary series of angularly spaced wheel-attaching studs 18 which are threaded at their exterior ends in a known manner. The studs 18 are in accordance with current practice located on a stud circle defined on flange 14 with a predetermined high degree of accuracy. But, as offered by this invention, such accuracy and costs attendant thereto may be relaxed to a degree which would not be acceptable in the overall quest for precision dynamic balance of these hub and wheel assemblies.

The flange 14 has mounted thereto over the studs 18 a brake rotor 20 of general conventional construction, the inner radial flange 22 of which has its inner margin closely sized for accurate seating on a shoulder 24 of hub 10, thereby to substantially center the rotor on the hub freely within the limits of oversized apertures 26 in the flange 22 receiving the studs 18.

While not shown it is to be understood that the wheel member, designated as 30, may be of conventional drop-center or other conventional construction suitable to the attached relation with a central hub, such as hub 10 as now to be described. As shown, the drop-center flange of wheel 30 extends inwardly to include a reversely bent rib 32 seating against the brake rotor flange 22 and merging with a flat flange portion 34 provided with a series of overlarge diameter lug apertures 36 complementary to the studs 18 and receiving the same with substantial clearance as may be dictated by relaxed manufacturing methods and costs that can be employed in the light of this invention.

Flat flange 34 terminates in a reversely bent marginal or circular pilot flange 40 which is, however, manufactured with sufficient accuracy with respect to the overall mass of wheel 30 as to insure an axis of surface revolution of such flange 40 which conforms with precision with the center of mass of the wheel. It will be appreciated that alternative styles of specific pilot flange shapes may be designed and adaptable to this invention, other than the reversely bent flange shown. The latter does serve, however, to provide a second engagement surface, as shown, with the radial flange 22 of the brake rotor. But this function, too, may be duplicated in other flange shapes.

Figure 2:
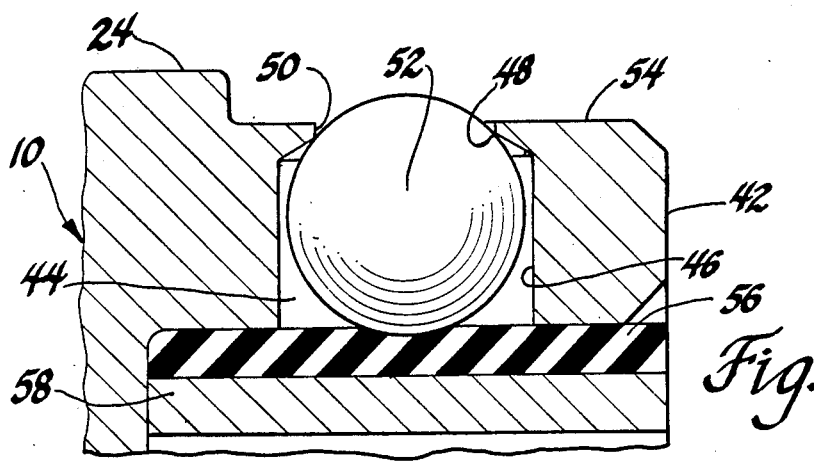
FIG. 2 is an enlarged view of a portion of FIG. 1.

Referring also to FIG. 2, hub 10 is provided with a pilot boss 42 of cylindrical conformation chamfered at its end for ease of installation of pilot flange 40 thereover. Boss 42 includes a series of ball receiving chambers 44, spaced generally equally angularly about the circumference of boss 42 and each partially defined by a main radial bore 46 terminating in a shoulder 48 at the end of an outer smaller diameter bore 50. Each chamber 44 contains relatively loosely therewithin a pilot ball 52 of diameter smaller than the bore 46. The depth of bore 50 is chosen so that with the ball 52 engaged against shoulder 48, the former projects a substantial distance radially outwardly beyond the cylindrical surface 54 of pilot boss 42.

In this embodiment, balls 52 serve as deflectible elements urged outwardly under the pressure exerted thereon from the compression experienced by a resilient rubber or other elastomer material annulus or sleeve 56 which is installed in a central cavity of pilot boss 42. The annulus 56 is pressed against and retained within such cavity wall by a properly sized retaining annulus 58 of steel or other rigid material.

The length of each chamber 44 from shoulder 48 inwardly is chosen properly in relation to the diameter of the balls therein that a suitable compression is developed in elastic annulus 56 to induce a substantial preload on the ball against shoulder 48. It has been found that with a thickness of elastic annulus 56 at least a few multiples of the depth of interference of ball 52 therewith in its preloaded condition, an elastomer rated at about 95 durometer provides acceptable results. In wheels having a pilot flange 40 in the neighborhood of about 60 millimeters in diameter, a series of balls 52 and chambers 44 therefor numbering between 5 and 7 may prove satisfactory for a ball diameter of about 0.25 inch.

Thus, balls 52, backed by the elastic annulus 56 constitute one form of inwardly deflectable elements interferingly engageable with but inwardly cammable under pilot flange 40 as the latter is forced over pilot boss 42 to insert lugs 18 within wheel apertures 36. With the established preload and with the indicated durometer of annulus and number of balls so engageable, it has been found that such interference engagement of pilot flange 40 over the balls causes the latter to deflect against a resistance in elastic annulus 56 sufficient to substantially center a wheel/tire assembly on the axis of hub 10 when in the position shown in FIG. 1, even when supporting the weight of such assembly with the latter in a vertical orientation as is normal.

Lug nuts 60 are employed, once the wheel/tire assembly is so installed, to secure the same to the hub 10. Nuts 60 are, of course, preferably of a flat seat variety as illustrated.

Figure 3:
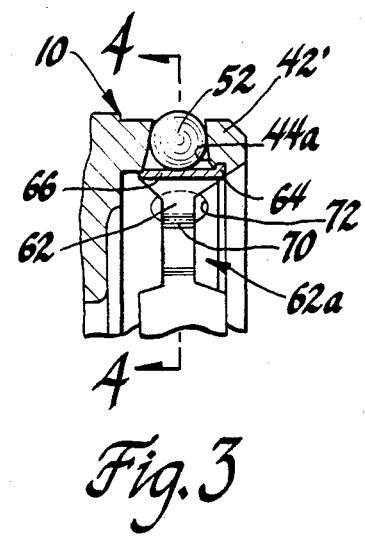
FIG. 3 is an enlarged fragmentary view showing a modification.
Figure 4:
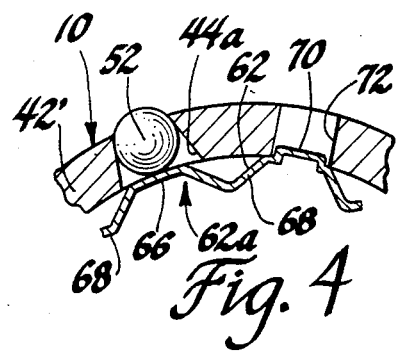
FIG. 4 is a fragmentary enlarged sectional view taken generally along the plane indicated by lines 4—4 of FIG. 3.

An alternative embodiment shown in FIGS. 3 and 4 illustrate some of the other choices that may be made within the spirit of the invention. Rather than a stepped diameter chamber 44, the balls 52 may reside in a purely conical or tapered wall chamber 44a, the end diameters and the angle of which are properly chosen to seat the balls for the required interfering engagement, as above described, with pilot flange 40. Further, resilient means other than the elastomeric annulus may be preferred, such as an undulated spring member of high carbon steel or the like configured as an annulus but self-supporting as to shape under the load of the wheel/tire assembly. As shown, the spring, enumerated 62, may include an outer marginal flange 64 retained in the central cavity of the pilot boss 42' by staking or coining thereover of a portion of the boss wall. Referring to FIG. 4, the steel spring 62 may take a variety of shapes but in basic form it may be an annulus divided into a number of sections, complementary to the number of balls 52, which are operative in bending to provide the necessary resilience and resistance to deflection thereof. Thus, a spring section 62a may include a flat ball seat portion 66 joined at either end with V-bent intervening portions 68. The latter then merge at their opposite ends each with a locating section 70 sized to be received in an aperture 72, a suitable series of which are provided around the circumference of pilot boss 42 whereby to retain the spring 62 therein under a general state of hoop compression induced in the spring when taken from a free state into its installed condition within the hub bore. Such compressive state can provide the preload on balls 52 heretofore described.

The embodiments of the invention in which an exclusive property or privilege is claimed are defined as follows:

1. A wheel assembly including a mounting hub, a wheel attachable thereover, said hub including a cylindrical pilot boss with an outer surface, a pilot flange on said wheel defining therein a central hole of a size adapted to receive the outer surface of said pilot boss with radial looseness, and pilot centering means comprising a series of radially inwardly deflectable elements projecting radially outward of said boss at spaced locations thereabout for interfering engagement with said flange and resilient means resisting inward deflection of said elements with force operative to permit attachment of said wheel over said hub yet substantially center said wheel on the axis of said boss with the wheel in a vertical orientation.

2. In a wheel hub adapted for attachment thereto of a wheel, pilot centering means comprising, a pilot boss on said hub with an outer surface, means defining a series of varying diameter holes at spaced locations about the circumference of said boss each including a minor diameter portion adjacent the outer surface of the latter and a major diameter portion inward thereof, a series of balls each in one of said holes and each of a diameter to be received movably in said major diameter hole portion and, under outwardly directed pressure thereon engaging the same against said boss at said minor diameter hole portion, adapted to project its surface beyond the outer surface of said boss, and resilient means pressing said balls outwardly of said boss.

3. The structure recited in claim 2 wherein said resilient means comprises an annulus of high durometer elastomer material underlying and engaged with said balls, and a backing ring of rigid material underlying said annulus.

4. The structure recited in claim 2 wherein said resilient means comprises an undulated metal spring having portions underlying and engaged with said balls.

5. A wheel assembly including a mounting hub with a series of attaching studs thereon, a wheel attachable over said hub having holes complementary to said studs sized to loosely receive the same, said hub including a cylindrical pilot boss with an outer surface, a pilot flange on said wheel defining therein a central hole of a size adapted to receive the outer surface of said pilot boss with radial looseness, means defining a series of stepped diameter chambers at spaced locations about the circumference of said boss each including a minor diameter portion adjacent the outer surface of the latter and a major diameter portion inward thereof, a series of balls each in one of said chambers and each of a diameter to be received movably in said major diameter portion thereof and, under outwardly directed pressure thereon engaging the same against said boss at said minor diameter chamber portion, adapted to project its surface beyond the outer surface of said boss for interfering engagement with said pilot flange, resilient means pressing said balls outwardly of said boss with force operative to permit attachment of said wheel on the axis of said boss with the wheel in a vertical orientation, and flat seat nuts received on said studs and engaged with said wheel.

* * * * *